3,377,779
AIR SEPARATION DEVICE AND LIQUID DELIVERY SYSTEM INCORPORATING SAME
Richard M. Kronk and Harry C. Stonecipher, Cincinnati, Ohio, assignors to General Electric Company, a corporation of New York
Filed Feb. 16, 1966, Ser. No. 527,827
2 Claims. (Cl. 55—204)

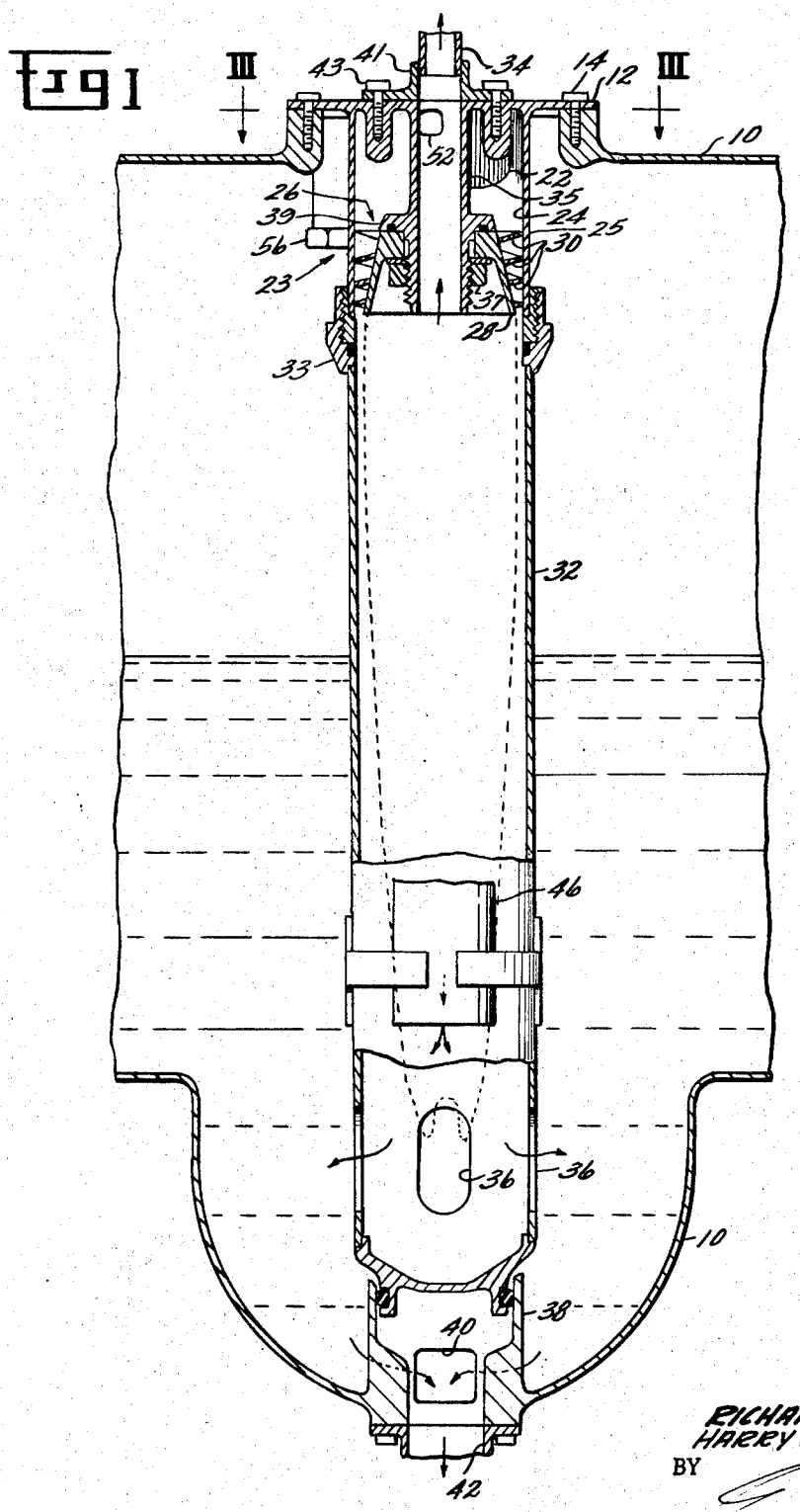

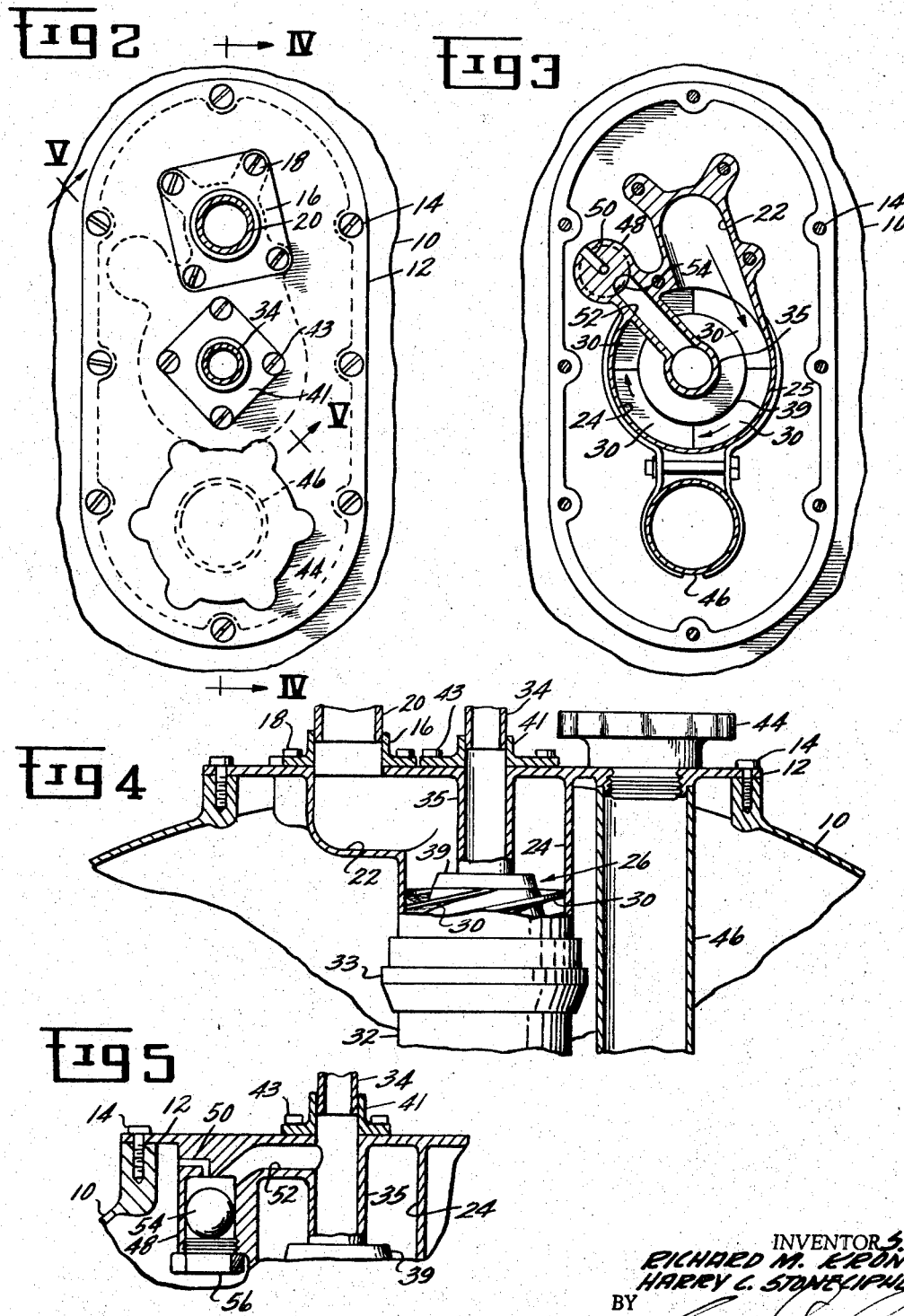

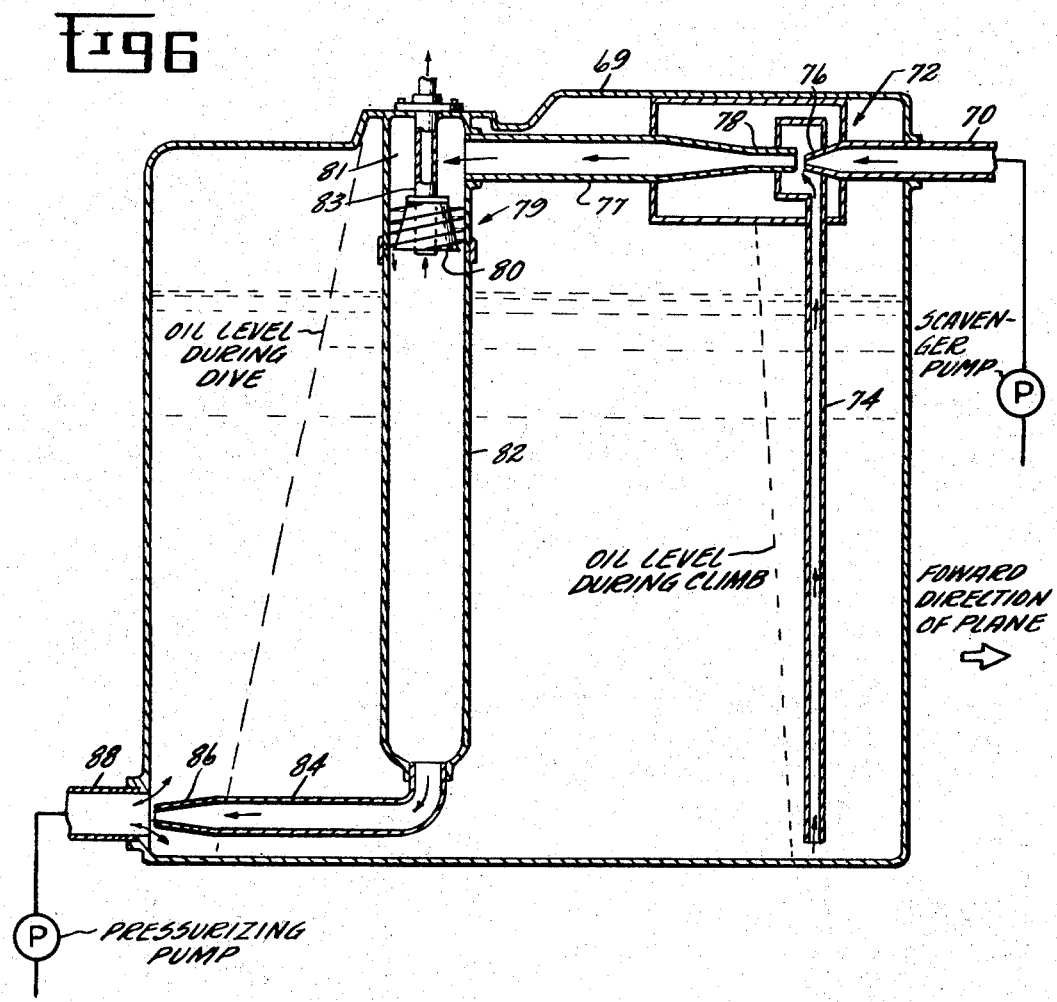

ABSTRACT OF THE DISCLOSURE

A separator for separating oil from an air-oil mixture wherein the mixture passes over a vortex generator to generate a free vortex in a tube. Separated air is vented through the vortex generator. De-aired oil goes into a tank. Pressure equalization between the air vent and the upper end of the tube assist in handling variations in flow rates. This separator can be employed in a system where continuous oil is supplied by siphoning oil from the bottom of the tank to the inlet of the separator through a jet pump, siphon tube assembly at the tank inlet.

---

The present invention relates to improvements in lubrication systems and more particularly to improved air or gas separators and liquid supply systems incorporating gas separators.

The motivating environment for the present invention is found in lubrication systems for engines employed in the propulsion of aircraft. In such lubrication systems it is essential to provide a source of deaerated oil for a pressurizing pump which continuously discharges oil to various bearings and the like requiring lubrication. This oil is then returned by a scavenging pump to a sump where it is deaerated to provide a continuous supply of oil in the closed lubrication system. In being returned by the scavenging pumps, sometimes extreme quantities of air, perhaps in a ratio of 50 to 1, are entrained in the oil. Further the rate of flow of the oil varies over a wide range. These factors plus the requirement of operating under practically all angles or attitudes, including inversion, pose serious problems in providing a continuous supply of deaerated oil for the lubrication system.

One object of the present invention is to provide an improved and highly simplified, effective means for deaerating oil or other liquids.

Another object of the invention is to provide a simple and reliable deaerating or degasifying system which is capable of operation in various and essentially all attitudes and minimizes the loss of oil when flying under conditions of inversion and also increases the effective capacity of the liquid storage tank used in such systems.

Yet another object of the invention is to provide an improved liquid system which is capable of delivering liquid at various attitudes as when incorporated in an aircraft lubrication system.

In one aspect the objects of the invention are attained in a liquid supply system to be operated at varying attitudes by provision of a sump tank having an inlet for connection with a source of gasified liquid and an outlet for connection with a pressurizing pump. A gas separator comprising a tube extending from the top of said tank to a point adjacent the bottom thereof is connected to the tank inlet by passageway means which enter tangentially into the upper end of the tube. A vortex generator over which the gasified liquid flows forms a liquid vortex within the tube to provide degasified liquid that may be discharged from the tube into the tank. A venting passageway extends through the vortex generator to the top of the tank to vent gas extracted from the liquid by the vortex action. A continuous supply of degasified liquid is maintained within the tank under widely varying attitudes, and upon inversion of the tank, a minimum of liquid is lost from the system.

In accordance with other objects of the invention the vortex generator of the gas separator comprises a conical member having at least one helical blade wrapped thereabout and forming, in combination with the conical member and the tube, a liquid flow passageway of progressively decreasing cross section which imparts a high tangential velocity to the liquid that is increased by the orifice effect at the lower end of the conical member. By this arrangement a vortex capable of effective gas separation may be maintained over widely varying flow rates.

In accordance with further objects of the invention a sump tank is provided in a liquid supply system to be operated under varying attitudes. The sump tank again has an inlet for connection with a source of gasified liquid and an outlet for connection with a pressurizing pump. The inlet terminates in a jet nozzle which discharges gasified liquid into a conduit leading to a gas separator. A siphon tube extends from the jet nozzle into the tank so that liquid will be drawn therefrom and provide additional liquid to the gas separator. The gas separator again comprises a tube extending into the tank and means for forming a liquid vortex in said tube to provide degasified liquid at the tube outlet. The outlet of the tube is in the form of a jet nozzle directed towards the tank outlet to thereby supply degasified liquid to the pressure pump under widely varying attitudes.

The above and other related objects and features of the invention will be apparent from a reading of the following description of the disclosure found in the accompanying drawings and the novelty thereof pointed out in the appended claims.

In the drawings:

FIGURE 1 is a view in section of a sump tank and gas separator embodying the present invention;

FIGURE 2 is a fragmentary plan view of the showing in FIGURE 1;

FIGURE 3 is a section taken on line III—III in FIGURE 1;

FIGURE 4 is a section taken on line IV—IV in FIGURE 2;

FIGURE 5 is a section taken on line V—V in FIGURE 2; and

FIGURE 6 is a view in section of another embodiment of the invention.

Lubrication systems of the type herein contemplated are closed systems wherein oil continually flows under pressure to bearings and the like and then is returned to a sump tank 10. As it is returned, the oil has entrained therein substantial quantities of air or other gases which must be removed if effective lubrication is to be provided.

Referring to FIGURES 1–3 the oil tank 10 is shown with an opening in its upper surface covered over by a plate 12 and secured thereto by screws 14. A cap 16 (see also FIGURE 4) is secured to the plate 12 by screws 18 and provides a tank inlet which is connected to an oil return conduit 20. Aerated oil from the conduit 20 is directed into a lateral passageway 22, conveniently formed integrally with the plate 12. The passageway 22 conveys the aerated oil to a deaerator 23, which comprises an elongated tube formed by a flange 25 integral with cap 12 and a separate tubular member 32 secured thereto by a nut 33. The passageway 22 enters tangentially into a circular chamber 24 at the upper end of the deaerator tube to induce a swirling action into the air/oil return mixture. This swirling action is further increased by a vortex generator indicated generally by reference character 26. The vortex generator comprises an inner conical member 28 about which are formed a plurality of helical blades 30. The helical blades 30, the conical member 28, in combination with the deaerator tube, form a flow path of progressively decreasing cross section having a very low pitch angle. This induces an extremely high centrifugal force which, in combination with the added velocity obtained by the orifice effect at the lower end of the conical member 28, causes the air/oil mixture to cling to the sides of the tube 32. The high centrifugal force imparted to the air/oil mixture forces the air, because of its lesser weight, inwardly and literally squeezes the air out of the oil so that as the oil progresses spirally down the tube 32, it becomes, at least substantially, wholly deaerated. The air so extracted from the air/oil mixture is entrained within the vortex formed by the swirling action of the vortex generator. This air is then vented by way of a central tube 35 through the interior of the conical member 28 and the interior of chamber 24 to a tube 34 which may be vented to atmosphere as desired. For convenience of assembly the conical member 28 is secured to the tube 35 by a nut 37 which clamps it against a flange 39. The tube 34 is conveniently secured to a cap 41 mounted on plate 12 by screws 43.

The degasified oil then passes through openings 36 at the lower end of the tube 32 and flows into the tank 10. The lower end of the tube 32 is positioned in a casting 38 secured to the lower end of the tank 10. The casting 38 has openings 40 leading to a discharge conduit 42 connected to the inlet of the pump for the lubrication system.

It will also be noted that the plate 12 is provided with a further opening normally sealed by a hand knob 44 which may be removed to provide oil to the tank 10 when the supply gets too low. A tube 46 extends from this opening to a point adjacent the bottom of the tank 10 to minimize splashing and aeration of the oil as it is introduced into the tank 10.

One of the prime features of the present invention is that the vortex generator 26 is extremely efficient in enabling an effective vortex to be generated where flow rates vary over an extremely wide range and the attitude of the tank also varies to extreme angles. This is particularly attributable to the described configuration of the vortex generator which gives extreme velocity even when great amounts of air are present. One problem posed, however, is that the vortex generator is so effective at higher flow rates that the depth of the vortex may become so great as to cause air to be discharged into the tank 10. It has been found that by providing an orifice connection between the upper end of the tank 10 and the vent tube 35, this problem is overcome while at the same time providing a connecting passageway allowing for substantial changes in the level of the oil in the tank.

Thus it will be noted that a boss 48 depends from the cap 12. An orifice passageway 50 extends through the boss 48 and into the interior thereof. From the interior of the boss 48 a further passageway 52 extends to the vent tube 35. With high scavenge return flow rates, a fairly substantial air pressure is generated by the vortex within the tube 32 which acts to extend the lower limit of the vortex downwardly below the level of the openings 36. As this occurs, any instability of the vortex will result in a bubble of air floating into the tank 10 to increase the pressure on the upper surface of the oil in the tank. The orifice passageway 50 has been found effective to maintain this equalizing pressure on the upper surface of the oil in the tank 10 and minimize the escape of air from the vortex. The orifice passageway 50 also serves as a vent to prevent substantial pressure variations in said tank as the oil level therein varies because of intermittent return of oil from the scavenging lines or for other reasons. Thus the dual function of providing for such a venting action to allow for extreme changes in the level of the oil, while at the same time providing a pressure force acting on the oil surface which minimizes the escape of air from the vortex, is quite effective.

It has also been recognized that oil tanks particularly used in aircraft are subject to the possibility of being inverted, or if not inverted, subjected to a negative gravity force, the effect of which would be the same as being inverted, the latter condition being easier to picture. Under such an operating condition, a minimal amount of oil is lost when using the present deaerating means. Thus it will be seen that when the tank 10 is inverted, escape of oil through the bleed orifice 50 is prevented by a weighted ball 54, disposed within the hollow boss 48 and maintained therein by a screw 56.

There will be only a slight amount of oil lost by reason of flow from the tube 32 to the venting tube 35, since in a condition of inversion the level of oil in the tank 10 will be below the openings 36 and the amount of oil actually within the tube 32 will be further minimized by the fact that the vortex and the air defined thereby occupies a large portion of the volume of the tube 32.

It will further be noted that in a condition of inversion, the scavenging pump normally continues operation, but little or no oil is returned to the passageway 22. A substantial quantity of air will, however, be returned since the scavenging pump is usually of the positive displacement type. When the tank is inverted, this scavenged air is readily vented through the tube 35.

FIGURE 6 illustrates another embodiment of the invention wherein the return oil from the scavenging pump is conveyed to a tank 69, under pressure, through a conduit 70 which extends to a jet pump 72 within the tank 69. The jet pump 72 comprises a siphon tube 74 extending into the oil reservoir within the tank 69 and opening into a chamber surrounding the jet tube nozzle 76 which forms the terminal end of the conduit 70. The jet nozzle 76 is spaced from a receiver 78 connected to a passageway 77 leading to a deaerator 79 and enters tangentially into a swirl chamber 81 at the upper end thereof. A vortex generator 80 (which may be the same as vortex generator 26) creates a liquid vortex in a tube 82. Air separated from the oil by this vortex action is vented through a central tube 83. The deaerated oil is discharged through a lateral conduit 84 which terminates in a nozzle 86 adjacent the bottom of the tank 69 and at a point remote from the siphon tube 74.

The nozzle 86 is directed into a tank outlet conduit 88 which is connected to the intake side of the pressurizing pump for the lubrication system in which the present invention is to be incorporated.

The described arrangement is particularly effective in providing a continuous supply of deaerated oil for an airplane lubrication system under most, if not all, normal flight attitudes, that is, during drives, climbs, rolls, etc. With the siphon tube 74 at the forward end of the plane when the plane goes into a dive, the oil level shifts, as indicated by the legend in FIGURE 6, to expose the entrance to the discharge conduit 88. Under this condition the oil returned by the scavenge pump in combination with the oil drawn from the siphon tube 74 will provide a sufficient volume of oil at the nozzle 86 to maintain a continuous supply of oil in the conduit 88. This is to say that oil is discharged from the nozzle 86 at a faster rate than it is required by the pump to which the conduit 88 is connected. Thus when the entrance to conduit 88 is exposed to air, oil is continuously supplied thereto with little or no air entrained therein.

In contrast, during a climb the oil level will shift, as indicated in FIGURE 6, exposing the entrance to the siphon tube 74. The entrance to the outlet conduit 88 will be submerged and deaerated oil will be continuously supplied to the lubrication system.

In all attitudes the vortex generated in the tube 82 is effective to remove substantially all air from the oil and vent it from the sump tank through the tube 83. The height of the tube 82 is made sufficient to accommodate the maximum depth of vortex so that air is not entrained in the lateral passageway 84.

It will also be apparent that during inverted flight the amount of oil lost is minimized in the same fashion described in connection with the previous embodiment. This is to say that the oil level under such condition will be below the entrances to nozzle 86 and siphon tube 74 and that the vent connection between the interior of the tank and the tube 83 is provided with a check valve. During inversion air from the scavenging pump will continue to be vented through the tube 83.

Having thus described the invention, what is claimed as novel and desired to be secured by Letters Patent of the United States is:

1. In a liquid supply system to be operated at varying attitudes,
   a sump tank containing a body of liquid therein and having an inlet for connection with a source of gasified liquid and an outlet for connection with a pressurizing pump,
   said inlet terminating in a jet nozzle,
   a gas separator,
   a conduit leading thereto which receives the discharge from said jet nozzle,
   a siphon tube extending from said jet nozzle into said tank whereby liquid will be drawn therefrom and provide additional liquid to the gas separator,
   said gas separator comprizing a tube extending into said tank and a vortex generator for forming liquid vortex in said tube, said tube terminating in a jet nozzle outlet directed towards the tank outlet to supply degasified liquid to said pressurizing pump under widely varying attitudes.

2. A combination as in claim 1 wherein the discharge from said gas separator tube extends in a lateral direction and
   the lower end of said siphon tube is disposed in said tank at a point remote from the terminal end of said gas separator tube.

References Cited
UNITED STATES PATENTS

| | | | |
|---|---|---|---|
| 1,841,556 | 1/1932 | Stelz | 55—456 X |
| 2,316,729 | 4/1943 | Tryon | 55—204 |
| 2,556,319 | 6/1951 | Davis | 55—204 |
| 2,982,374 | 5/1961 | Hughes et al' | 55—182 |
| 3,128,719 | 4/1964 | Jongbloed et al. | 55—456 X |
| 2,346,005 | 4/1944 | Bryson | 55—457 X |

REUBEN FRIEDMAN, *Primary Examiner.*

R. W. BURKS, *Assistant Examiner.*